United States Patent

[11] 3,550,719

| [72] | Inventor | William J. Meister |
| | | El Paso, Tex. |
| [21] | Appl. No. | 690,679 |
| [22] | Filed | Dec. 14, 1967 |
| [45] | Patented | Dec. 29, 1970 |
| [73] | Assignee | Globe Universal Sciences, Inc. |
| | | a corporation of Texas. by mesne |
| | | assignments |

| [54] | SEISMIC ENERGY GENERATOR HANDLING MECHANISM |
| | 4 Claims, 5 Drawing Figs. |
| [52] | U.S. Cl...................................................... 181/0.5, |
| | 94/48 |
| [51] | Int. Cl....................................................... G01v 1/04 |
| [50] | Field of Search............................................ 181/.5C3, |
| | .5C4; 94/48, 49 |

[56] References Cited
UNITED STATES PATENTS

| 2,772,746 | 12/1956 | Merten........................ | 181/.5 |
| 2,938,438 | 5/1960 | Hamilton..................... | 181/.5 |
| 3,024,861 | 3/1962 | Clynch......................... | 181/.5 |
| 3,209,854 | 10/1965 | Williams....................... | 181/.5 |
| 3,356,178 | 12/1967 | Nash, Jr....................... | 181/.5 |
| 3,280,935 | 10/1966 | Brown.......................... | 181/0.5 |

Primary Examiner—Rodney D. Bennett, Jr.
Assistant Examiner—Daniel C. Kaufman
Attorney—Arnold, Roylance, Kruger & Durkee ABSTRACT: A seismic signal generator is supported from a transport vehicle by means of a manipulating mechanism for raising and lowering the generator whereby the generator is permitted three axes of rotational freedom to facilitate positive coupling to the ground under conditions of severe terrain contour.

PATENTED DEC 29 1970   3,550,719

INVENTOR:
WILLIAM J. MEISTER
BY: Frelling E Baker
HIS ATTORNEY

INVENTOR:
WILLIAM J. MEISTER
BY: Freling E Baker
HIS ATTORNEY

SEISMIC ENERGY GENERATOR HANDLING MECHANISM

BACKGROUND OF THE INVENTION

The present invention relates to the art of seismograph surveying, and pertains more particularly to an improved portable seismic transducer.

A method commonly employed for locating petroleum and other mineral deposits is known as seismic prospecting. This involves the generation of a signal such as sound waves which is directed downward into the earth and is reflected back to the surface by various layers of strata. These reflected signals are picked up, recorded, and analyzed to determine the characteristics of the formation. Probably the most common method of generating a seismic signal is by means of an explosive charge which is planted beneath the surface of the earth. There are various drawbacks to the use of the explosive charge for generating a seismic signal. Among these drawbacks or disadvantages is the time and expense involved in drilling the holes to place the charge at a sufficient depth in an earth formation. Another drawback to such a method of prospecting is that many municipalities refuse to permit the use of explosives within their boundaries. Still another disadvantage of the use of explosives for generating such seismic signals is their potential damage to adjacent property.

Many seismic signal-generating devices have recently come into use which avoid the above disadvantages of the use of explosives. These seismic signal-generating devices are generally referred to as surface sources because they generally generate and send the signal from a point on the earth's surface. One form of surface source is the vibratory shaker which generally rests on the earth's surface and transmits vertically directed vibratory oscillations which are transmitted through some coupling means into the earth's surface. The vibrations are generally created by means of an eccentric rotating mass or a vertically reciprocating mass. The second type of generator is the impulse type in which some type of explosion or impulse is created in a domelike container which rests on the earth's surface. The signal or impulse is generated by means of an explosion such as a gas explosion or a plasma explosion. The impulse from the explosion is transmitted to the earth's surface through some type of coupling means such as a diaphragm or a movable plate.

The surface source type of signal generators are usually made portable such as by mounting on a transport vehicle. The mounting of such generators on such transport vehicles require effective manipulating mechanisms for manipulating the generator into position for transportation and also for manipulating the generator into proper position for effective coupling to the earth's surface. The manipulating mechanism must be so constructed to insure that an effective coupling will be established between the seismic generator and the earth's surface under conditions of severe terrain contour. Two things may be done which improve the coupling of the seismic generator to the earth's surface. One of these is to couple the generator to the transport vehicle in such a manner that it may conform to the contour of the earth's surface. This in general would be an articulated connection. A second thing which may be done to improve the coupling is to provide means for transferring the weight of the transport vehicle to the sonic generator. Prior art devices have attempted to accomplish the above results by various structures. However, these prior art devices are generally complicated linkage arrangements which have other disadvantages such as being bulky and susceptible to frequent breakdowns.

SUMMARY OF THE INVENTION

It is a primary object of the present invention to overcome the disadvantages of prior art apparatus by providing a seismic generator manipulating apparatus which permits a seismic generator to conform to the contour of the earth's surface to furnish a more effective coupling thereto.

It is a further object of the present invention to provide a simple and inexpensive seismic generator-handling apparatus which permits an effective transfer of the weight of the transport vehicle to the seismic generator for more effective coupling thereof to the earth's surface.

In accordance with the primary aspects of the present invention a seismic signal generator is attached to a transport vehicle by an improved manipulating mechanism which permits the seismic generator to pivot in such a manner as to conform to the contour of the earth's surface, which mechanism also transfers a substantial portion of the weight of the transport vehicle to the seismic generator for more effective coupling thereof to the earth's surface.

BRIEF DESCRIPTION OF THE DRAWING

Many additional objects and advantages of the present invention will be evident to those skilled in the art from the following detailed description and drawings wherein.

DESCRIPTION OF THE PREFERRED EMBODIMENT

Figure 1:
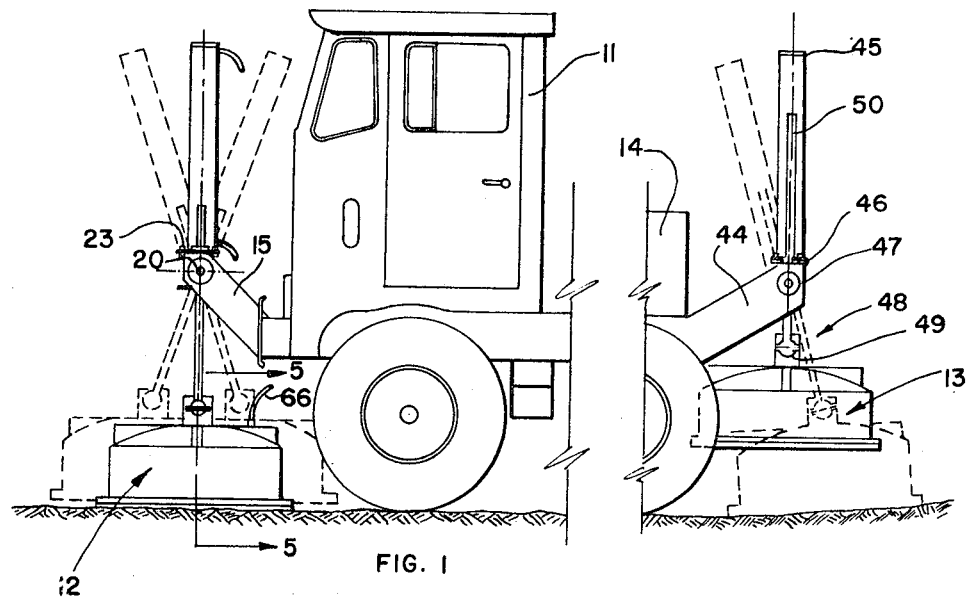
FIG. 1 is a side elevation of a seismic vehicle constructed in accordance with the present invention.
Figure 5:
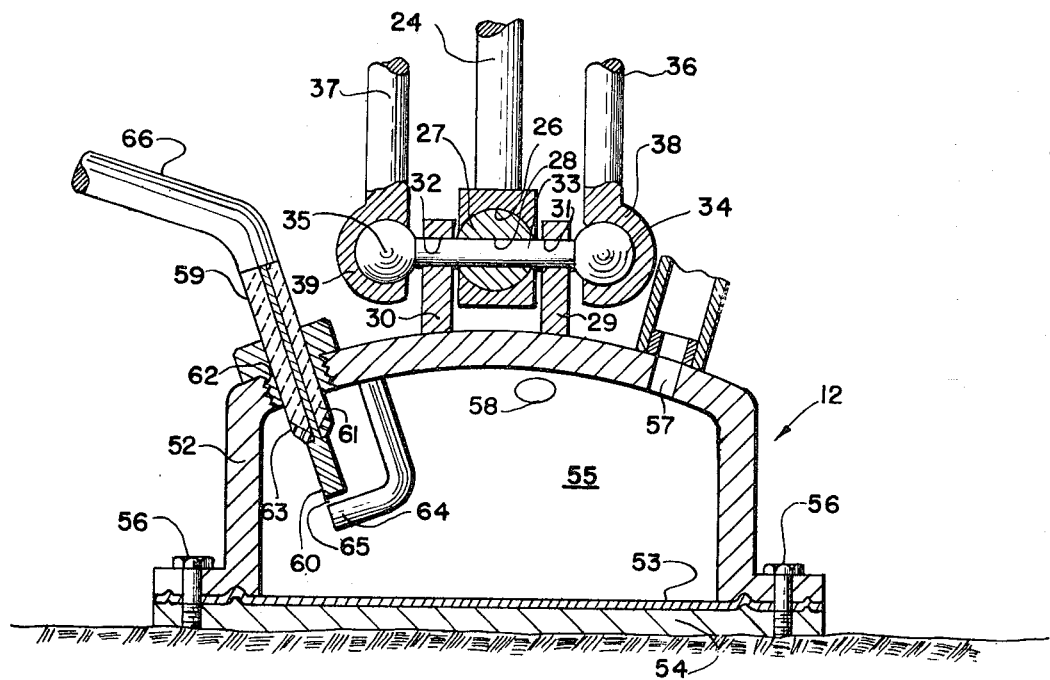
FIG. 5 is a view taken along line 5—5 of FIG. 1.

Referring now to FIG. 1, a transport vehicle or truck 11 is shown for transporting a pair of seismic transducers or generators 12 and 13 and suitable control equipment 14 therefor. A suitable arrangement for the apparatus of the present invention is that as shown in FIG. 1 in which one seismic signal generator 12 is mounted or supported on the forward end of the vehicle and a second transducer or signal generator 13 is mounted or supported from the rear end of the vehicle. The forward lifting and manipulating mechanism will now be described in more detail. The manipulating mechanism for the forward signal generator comprises elevator means which comprises a pair of support arms 15 and 16 extending outward from the front of the vehicle 11. A support platform 17 is pivotally supported between support arms 15 and 16 by means of trunnions 18 and 19. These trunnions 18 and 19 extend into bearings 20 and 21 and support arms 15 and 16. This pivotal arrangement permits the assembly to swing fore and aft along the axis of the vehicle, permitting the lift assembly to remain substantially vertical when the vehicle is headed up or down an incline. The prime mover means for the elevator means of the assembly comprises a double-acting fluid motor 22 mounted on support platform 17 in any suitable manner such as by bolts 23. Piston rod 24 extends downward from the fluid motor means 22 and is connected by means of universal joint means 25 to the seismic impulse signal generator 12. The universal joint means 25 may be typically a ball and socket arrangement such as illustrated in FIG. 5 wherein a substantially spherically shaped socket 26 receives a spherically shaped ball member 27. The ball or spherical member 27 has a central cylindrical bore 28 therethrough. A pair of brackets 29 and 30 extend upward from the top of the impulse generator and have aligned cylindrical bores 31 and 32 therethrough. A pin 33 extends through the aligned bores 31 and 32 and 28 for coupling the assembly together. A pair of ball or spherical elements 34 and 35 are formed or otherwise suitably attached in any suitable manner to the ends of pin 33. Guide means which comprises a pair of elongated cylindrical rods 36 and 37 extending upward substantially parallel to the axis of prime mover means 22 is universally pivotally connected by means of sockets 38 and 39 formed on the lower end of elongated cylindrical rods 36 and 37. The guide rods 36 and 37 extend upward substantially parallel to and along the axis of piston rod member 24 and extend through suitable guide bores (not shown) formed in support platform 17. The guide bores are preferably formed of or at least lined with suitable bearing means such as bronze bushings 40 and 41. The universal connection means 25 between the seismic impulse generator 12 and the elevator means 22 insures that the impulse generator 12 will be universally movable relative to the vertical axis of the elevator means whereby the elevator means may maintain a substantial vertical orientation irrespective of the slope of the earth formation on which the impulse generator 12 rests. This permits the impulse generator 12 to pivot in any direction to conform to the slope of the formation and insure an effective coupling thereof to the formation. The signal generator is free to move as shown in the dotted outline shown in FIG. 2. The signal generator 12 is free to move relative to the axis designated as X' to various orientations which may be designated by lines 42 and 43. It is to be understood that these lines 42 and 43 do not define limits of movement but merely are illustrative of possible positions. The overall assembly is free to pivot about trunnions 18 and 19 to various positions such as the dotted outline positions shown in FIG. 1. The rear seismic impulse generator 13 and its support and elevator assembly is substantially identical to the forward generator and its assembly. For this reason the rear assembly will only be briefly described. The rear generator support and assembly comprises support arms 44 extending outwardly from said vehicle 11. The elevator assembly comprises a fluid motor or prime mover means 45 mounted on a support platform 46 which in turn is pivotally mounted by trunnion means 47 identical to that of the forward assembly. A downwardly extending piston rod extends downward from prime mover means 45 and is universally connected or pivotally connected by universal connection means 48 to upwardly extending bracket means 49 attached to the top part of impulse generator 13. Guide means in the form of an elongated cylindrical rod 50 is pivotally connected by universal means 51 and extends upward through a bore (not shown) in support platform 46.

Figure 2:
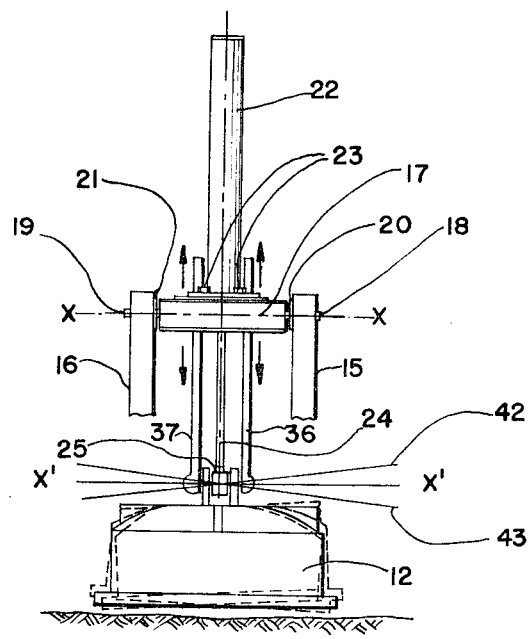
FIG. 2 is a side view of the transducer elevator assembly.
Figure 3:
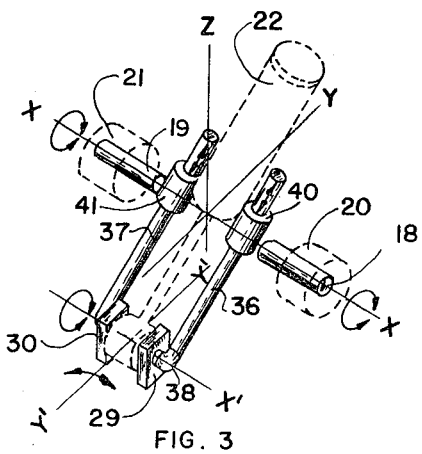
FIG. 3 is a isometric view schematically illustrating the freedom of movement permitted by the transducer elevator assembly.

The guide means of the support and elevator assembly which comprises guide rods 36 and 37 as shown in FIG. 2 insures lateral stability of the system by preventing the impulse generator 12 from moving laterally as viewed in FIG. 2 and consequently damaging piston rod 24. This guide assembly also prevents the impulse generator 12 from rotating about the axis of prime mover means 22 and consequently causing angular misalignment of the impulse generator 12 and damaging electrical and fluid conduits leading thereto. The impulse signal generator of the present invention is preferably of the type generally referred to as a single-impulse generator. Two main types of impulse generators are the gas exploder and the plasma exploder types. The gas exploder type of impulse generator generates an explosion in a thick-walled chamber resulting in a shock wave causing a sharp impact on the ground through what may be termed a signal transfer plate and may comprise a flexible plate or diaphragm member in contact with the earth's surface. The gas exploder type of signal generator may preferably be of the type disclosed in U.S. Pat. No. 2,772,746, issued to E. Merten. The exploding plasma type of impulse generator operates by discharging a high level of electrical energy in a fluid that is confined in a chamber; a plasma is formed in the fluid causing a resulting shock wave in a signal transfer plate into the earth formation. The plasma explosion type of generator is preferably of the type disclosed in U.S. Pat. No. 3,268,028, issued to J. W. Miller. The explosion chamber for either of the types of impulse generators discussed above would be substantially the same and may be as that illustrated in FIG. 5.

As illustrated in FIG. 5, a heavy, thick-walled dome or bell-shaped housing member 52 is sealed off by suitable means such as a diaphragm 53 and signal transfer plate 54 to form an explosion chamber 55. A signal transfer plate 54 is connected in any suitable manner such as by bolts 56 over the open end of the housing 52. The diaphragm member 53 is sealed such as by clamping between transfer plate 54 and housing member 52. A pair of ports 57 and 58 communicate from the interior of the explosion chamber via suitable conduit means to a source of fluid as in the case of the plasma explosion type of signal generator. These ports serve in the case of the gas exploder as intake and exhaust ports, one port being connected by means of suitable conduit means to an explosive gas and the other port such as 58 being vented to the atmosphere for the exhaustion of exploded gas. In either case a spark plug or plurality of spark plugs 59 is suitably located in the explosion chamber. The spark plug comprises a central steel electrode 60 encased in insulation 61 which extends through port 62 in the housing 52. A metal deflector cap 63 covers the end of the insulator body 61 to prevent shock waves from directly hitting the insulating material, and thus protecting the insulating material against undue stresses and strain. A ground conductor 64 extends from the housing 52 to a point adjacent the end of electrode 60 to form a gap 65 across which electrical energy is discharged. An electrical conductor or conduit 66 extends from the outer end of electrode 60 leading to a source of high-level electrical energy, not shown.

Figure 4:
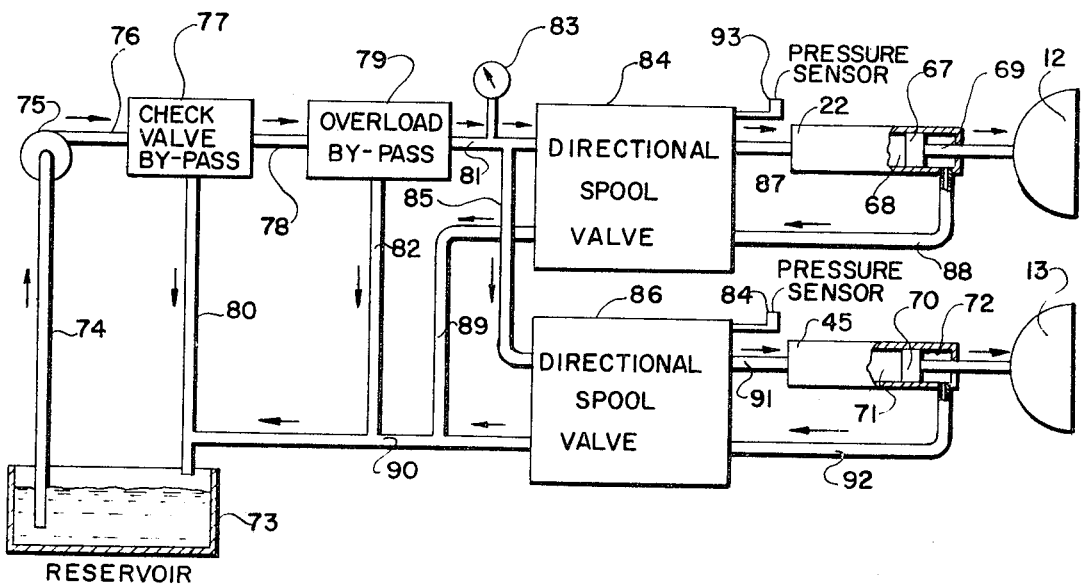
FIG. 4 is a schematic view of a hydraulic system for the elevator assembly of the present invention.

The prime mover means for the elevator system of the present apparatus is preferably fluid operated, although it is apparent that other prime mover means such as electrically operated may be substituted therefor. The fluid for the prime mover means may be either a hydraulic fluid or a compressed gas. However, for ease of description, the hydraulic system is illustrated in FIG. 4. The prime mover means 22 typically comprises a double-acting piston enclosed in an elongated cylindrical chamber separating the chamber into upper pressure chamber 68 and lower pressure chamber 69. A like arrangement exists for prime mover means 45 which comprises a double-acting piston 70 enclosed in the cylindrical bore of the prime mover means 45 separating the bore into an upper pressure chamber 71 and a lower pressure chamber 72. The fluid system as illustrated in FIG. 4 comprises a source of fluid such as reservoir 73 from which leads conduit 74 to a constant velocity pump 75. A conduit 76 leads from the output or high-pressure side of pump 79 to throttle or bypass valve 77 which may be positioned to send a stream of fluid down conduit 78 to overload bypass valve 79 or down conduit 80 back to reservoir 73. The overload bypass valve 79 directs the flow of fluid down conduit 81 as the prime movers are being operated or back to the reservoir by was of conduit 82 when the fluid motors are being held stationary. Indicator means 83 indicates the hydraulic pressure in conduit means 81. Conduit 81 leads to 4-way valve 84 while a branch conduit 85 leads to 4-way valve 86. 4-way valve 84 is operative to permit the flow of fluid from conduit 81 via conduit 87 to pressure chamber 68 and at the same time permit the exhaust of fluid from pressure chamber 69 via conduit 88 and conduit 89 back to return conduit 90 and thence to the reservoir 73. 4-way valve 86 is operative to direct the flow of fluid from conduit 85 via conduit 91 to pressure chamber 71 for extending or lowering the elevator means and likewise signal generator 13. Simultaneously therewith the 4-way valve 86 permits the flow of fluid from pressure chamber 72 by way of conduit 92 to exhaust conduit 90 and back to reservoir 73. Directional valve or 4-way valve 84 is operative to direct the flow of fluid from conduit 81 by way of conduit 88 to pressure chamber 69 simultaneously therewith permit the flow of fluid from pressure chamber 68 by means of conduit 87 to conduit 89 into conduit 90 and back to reservoir 73. This latter operation is effective to raise the elevator means and consequently signal generator 12. In a similar manner 4-way valve 86 is effective to direct fluid pressure from conduit 85 by way of conduit 92 and pressure chamber 72 simultaneously therewith to permit the flow of fluid from pressure chamber 71 by way of conduit 91 into conduit 90 and back to reservoir 73. This operation is effective to raise the elevator means and the signal generator 13. Generally, in operation of the apparatus of the present invention both signal generators are lowered into engagement with the earth's surface and fired simultaneously. In order to obtain a more effective coupling and thus transfer of energy to the earth's surface, a substantial portion of the weight of the transport vehicle is transferred from the wheels of the vehicle to the signal generators. This is done by increasing the pressure in the upper chambers 68 and 71 of the elevator means for the desirable predetermined pressure which may preferably be just short of that necessary to lift the vehicle from the ground. Pressure-sensing means 93 and 94 are responsive to the predetermined pressure in chambers 68 and 71 to actuate overload bypass valve 79 to divert fluid flow through conduit 82 and back by way of conduit 92 to reservoir 73.

Having just described a preferred embodiment of my invention, it is to be understood that various changes, substitutions and alterations may be made therein without departing from the spirit and scope of the invention as defined by the appended claims.

I claim:
1. A mechanism for handling a seismic energy generator comprising:
   a transport vehicle;
   a support arm extending laterally outward from said vehicle;
   a pivotal support carried by said support arm, said pivotal support being rotatable about a horizontal axis through said support arm;
   an elevator shaft extending vertically through said pivotal support;
   a first universal joint connected to the lower end of said elevator shaft;
   a seismic energy generator suspended from said elevator shaft by connection with said first universal joint;
   a pair of guide rods extending through said pivotal support substantially parallel to the axis of said elevator shaft;
   second and third universal joints each connecting one of said guide rods to said seismic energy generator, such that said seismic energy generator is restrained from moving transversely with respect to said transport vehicle and twisting with respect to said elevator shaft; and
   a prime mover carried by said pivotal support for raising and lowering said elevator shaft to thus move said seismic energy generator into and out of contact with the earth.

2. The mechanism of claim 1 wherein said prime mover comprises:
   a double-acting fluid motor;
   a source of pressurized fluid communicating with said fluid motor;
   control means responsive to the pressure of said fluid to control the force of engagement of said signal generator with the earth's surface.

3. A mechanism for handling a seismic energy generator comprising:
   a transport vehicle;
   a support arm extending laterally from said vehicle;
   a pivotal support carried by said support arm;
   an elevator shaft extending vertically through said pivotal support;
   a first universal joint coupled to the lower end of said elevator shaft, said seismic energy generator being suspended from said elevator shaft by connection with said first universal joint;
   an elongated guide member extending substantially parallel to the axis of said elevator shaft through said pivotal support;
   a second universal joint coupling one end of said guide member to said seismic energy generator;
   a guideway carried by said pivotal support for directing said guide member substantially along the axis of said elevator shaft so as to prevent transverse movement of said seismic energy generator relative to said elevator shaft; and
   a prime mover carried by said pivotal support and coupled to said elevator shaft for raising and lowering said seismic energy generator, whereby said seismic energy generator can swing with pendulate movement with respect to said transport vehicle when not in contact with the earth's surface.

4. The mechanism of claim 3 wherein said guide member comprises a pair of guide shafts, each guide shaft extending through a separate guideway on opposite sides of said elevator shaft, and each guide shaft being connected to said seismic energy generator by a separate universal joint.